(12) United States Patent
Suryanarayana et al.

(10) Patent No.: US 12,743,284 B2
(45) Date of Patent: Sep. 22, 2026

(54) PROCESSOR ENVIRONMENT AGNOSTIC ADAPTIVE OPTIMAL PLATFORM ECOSYSTEM TUNING FOR HETEROGENEOUS HARDWARE EXCHANGES

(71) Applicant: Dell Products L.P., Round Rock, TX (US)

(72) Inventors: Shekar Babu Suryanarayana, Bangalore (IN); Karunakar Poosapalli, Bangalore (IN); Harish Barigi, Nellore (IN)

(73) Assignee: Dell Products L.P., Round Rock, TX (US)

( * ) Notice: Subject to any disclaimer, the term of this patent is extended or adjusted under 35 U.S.C. 154(b) by 137 days.

(21) Appl. No.: 18/901,198

(22) Filed: Sep. 30, 2024

(65) Prior Publication Data

US 2026/0093499 A1 Apr. 2, 2026

(51) Int. Cl.
*G06F 15/177* (2006.01)
*G06F 9/00* (2018.01)
*G06F 9/24* (2006.01)
*G06F 9/4401* (2018.01)

(52) U.S. Cl.
CPC .................................. *G06F 9/4401* (2013.01)

(58) Field of Classification Search
CPC .................................................... G06F 9/4401
See application file for complete search history.

(56) References Cited

U.S. PATENT DOCUMENTS

2001/0042243 A1* 11/2001 Fish .................... G06F 9/44547 713/1
2008/0002760 A1* 1/2008 Nasielski ............. G06F 9/4415 375/222
2019/0392148 A1* 12/2019 Ganesan ............... G06F 9/4411
2025/0251942 A1* 8/2025 Suryanarayana ..... G06F 9/4403
2026/0030031 A1* 1/2026 Gopalan ............... G06F 9/4403

* cited by examiner

*Primary Examiner* — Xuxing Chen
(74) *Attorney, Agent, or Firm* — Terrile, Cannatti & Chambers, LLP; Stephen A. Terrile

(57) ABSTRACT

A firmware management operation. The firmware management operation includes providing an information handling system with a distributed BIOS; identifying a processor environment installed on an information handling system from a plurality of processor environments; performing a derived firmware management operation, the derived firmware management operation adaptively supporting a hardware component of the information handling system when an exchanged hardware component lacks native firmware support.

14 Claims, 13 Drawing Sheets

PROCESSOR ENVIRONMENT AGNOSTIC ADAPTIVE OPTIMAL PLATFORM ECOSYSTEM TUNING FOR HETEROGENEOUS HARDWARE EXCHANGES

BACKGROUND OF THE INVENTION

Field of the Invention

The present invention relates to information handling systems. More specifically, embodiments of the invention relate to performing a firmware management operation.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a computer-implementable method for performing a firmware management operation, comprising: providing an information handling system with a distributed unified BIOS; identifying a processor environment installed on an information handling system from a plurality of processor environments, the processor environment comprising processor architecture; and, performing a derived firmware management operation, the derived firmware management operation adaptively supporting a hardware component of the information handling system when an exchanged hardware component lacks native firmware support.

In another embodiment the invention relates to a system comprising: a processor; a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: providing an information handling system with a distributed BIOS; identifying a processor environment installed on an information handling system from a plurality of processor environments; performing a derived firmware management operation, the derived firmware management operation adaptively supporting a hardware component of the information handling system when an exchanged hardware component lacks native firmware support.

In another embodiment the invention relates to a computer-readable storage medium embodying computer program code, the computer program code comprising computer executable instructions configured for: providing an information handling system with a distributed BIOS; identifying a processor environment installed on an information handling system from a plurality of processor environments; performing a derived firmware management operation, the derived firmware management operation adaptively supporting a hardware component of the information handling system when an exchanged hardware component lacks native firmware support.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
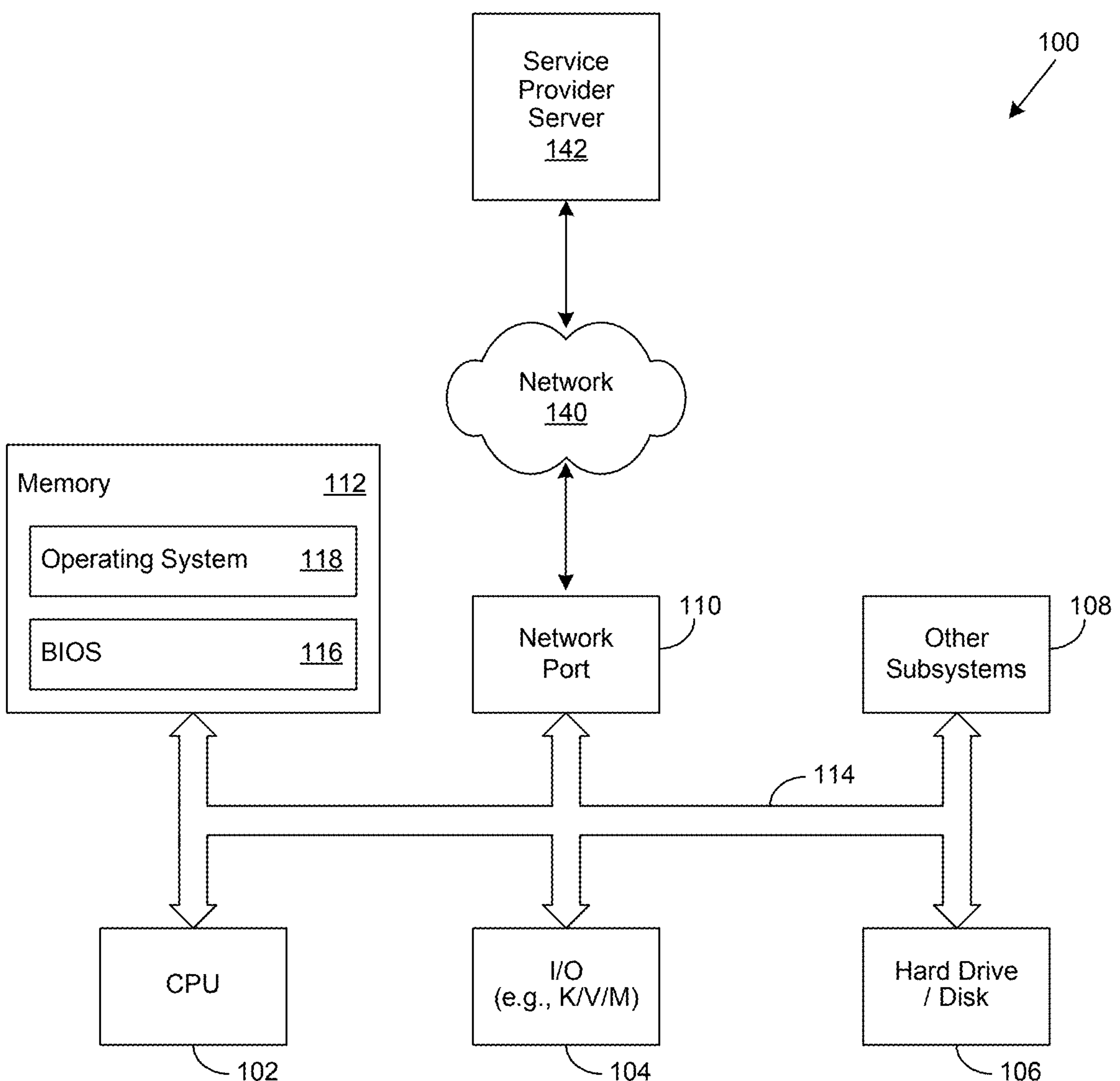
FIG. 1 shows a general illustration of components of an information handling system as implemented in the system and method of the present invention.

A system, method, and computer-readable medium are disclosed for performing a firmware management operation, described in greater detail herein. Various aspects of the invention reflect an appreciation that it is not uncommon for certain firmware components of a Basic Input/Output System (BIOS) associated with an information handling system (IHS) to be added, deleted, updated, revised, replaced, or restored over time. Likewise, various aspects of the invention reflect an appreciation that such BIOS firmware components are often added, deleted, updated, revised, replaced, or restored to provide security updates, fix known software bugs, improve performance, add new features and functionalities, and so forth.

Various aspects of the invention reflect an appreciation that it is common for manufacturers or vendors to provide an IHS that has default hardware components, or customer-configurable hardware configurations, or both. Likewise, various aspects of the invention reflect an appreciation that it is also common for customers to exchange, or replace, certain IHS hardware components. For example, a video graphics card based on one manufacturer's (e.g., Intel®) processor may be switched out for a different video graphics based upon another manufacturer's (e.g., NVIDIA®) processor. As another example, the number of Dual Inline Memory Modules (DIMMs) may be increased or decreased, using components from a different manufacturer. Accordingly, situations may arise where native firmware support may not be available for certain new, or exchanged, hardware components in the reconfigured IHS.

To elaborate on the preceding examples, various aspects of the invention reflect an appreciation that exchanged IHS hardware components may not have native firmware drivers. As a result, the absence of such firmware drivers may result in a failure for the system to boot properly, unexpected or continuous system reboots, variances in expected power and thermal gradients, or other unanticipated behaviors. Accordingly, changes in an IHS's hardware component configuration may lead to system instability and diminished performance due to associated workload configurations. Furthermore, such changes may likewise lead to complications related to system maintenance and management.

For purposes of this disclosure, an information handling system (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, read-only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system that can be used to implement the system and method of the present invention. In certain embodiments, the information handling system (IHS) 100 may be implemented to include a processor (e.g., central processor unit or "CPU") 102, various input/output (I/O) devices 104, such as a display, a keyboard, a mouse, a touchpad, or a touchscreen, and associated controllers, a hard drive or disk storage 106, and various other subsystems 108. In various embodiments, the IHS 100 may also be implemented to include a network port 110 operable to connect to a network 140, which in turn may be implemented to provide access to a service provider server 142. In various embodiments, the IHS 100 may likewise be implemented to include system memory 112, which is interconnected to the foregoing via one or more buses 114.

In various embodiments, system memory 112 may be configured to store program code, or data, or both, which in turn may be implemented to be accessible and executable by the CPU 102. In various embodiments, system memory 112 may be implemented using any suitable memory technology. Examples of such memory technology include random access memory (RAM), static RAM (SRAM), dynamic RAM (DRAM), synchronous dynamic RAM (SDRAM), non-volatile RAM (NVRAM), read-only memory (ROM), erasable programmable read-only memory (EPROM), electrically erasable programmable ROM (EEPROM), complementary metal-oxide-semiconductor (CMOS) memory, flash memory, or any other type of computer memory, whether it may be volatile or non-volatile. In various embodiments, system memory 112 may include one or more dual in-line memory modules (DIMMs), each containing one or more RAM modules mounted onto an integrated circuit board.

In various embodiments the system memory 112 may further be implemented to include a Basic Input/Output System (BIOS) 116, or an operating system (OS) 118, or both. Skilled practitioners of the art will be aware that BIOS 116, also known as System BIOS, ROM BIOS, or personal computer (PC) BIOS, is a type of firmware used to provide runtime services for an OS 118 to perform hardware initialization during the booting process of an IHS 100. Those of skill in the art will likewise be aware that firmware is a combination of persistent memory, program code, and data that provides low-level control of an IHS's 100 hardware. In various embodiments, the BIOS 116 may be implemented to initialize and test certain hardware components of its associated IHS 100 during the booting process (e.g., Power-On Self-Test, or "POST"), followed by loading a boot loader from a particular mass storage device, which in turn may then be used to initialize a kernel.

In various embodiments, such BIOS 116 firmware may be implemented to provide hardware abstraction services to higher-level software such as an OS 118. In various embodiments, BIOS 116 firmware may be implemented in a less complex IHS 100 as an OS 118, performing all control, monitoring, and data manipulation functions. In various embodiments, certain components of a particular IHS 100 may be implemented to have its own firmware, which may store operational variables, data structures, or in general, any sort of information.

In various embodiments, NVRAM may be implemented to store a BIOS 116 associated with the IHS 100. In various embodiments, the NVRAM may also be implemented to hold the initial processor instructions required to bootstrap the IHS 100, store calibration constants, passwords, or setup information, or a combination thereof. In various embodiments, such setup information may be stored as variables in the NVRAM such that the variables are available during system boot from a power-off state. Various embodiments of the invention reflect an appreciation that such variables may need to be modified, revised, updated, restored, or replaced from time to time if they become corrupted. In various embodiments, an NVRAM driver may be implemented to use NVRAM headers to initialize and enable read/write services for updating or restoring such variables. Accordingly, as it relates to various embodiments of the invention, the terms "firmware," "NVRAM," or "BIOS" may be used generically and interchangeably.

In various embodiments, the functionality of a BIOS 116 may be implemented according to the Unified Extensible Firmware Interface (UEFI) specification, which describes how an IHS's 100 firmware interacts with a particular OS 118. Various embodiments of the invention reflect an appreciation that UEFI, as typically implemented, may offer certain features and benefits that are not available from traditional BIOS 116 implementations, such as faster boot times, improved security, support for larger storage devices, and higher definition graphical user interfaces (GUIs). In addition, UEFI stores all data related to the IHS's 100 initialization and startup within an .efi file, rather than on its associated firmware. In typical implementations, the .efi file may be stored on a special memory partition known as an EFI System Partition (ESP), which also contains the IHS's 100 bootloader.

In various embodiments, BIOS 116 may be instantiated as a distributed BIOS 116. As used herein, a distributed BIOS 116 broadly refers to a BIOS 116 that includes a plurality of BIOS 116 components, or a plurality of BIOS 116 variables, or a plurality of BIOS 116 storage locations, or a combination thereof. In various embodiments, the distributed BIOS 116 may be implemented to function with any of a plurality of processor environments, described in greater detail herein. In certain embodiments, the distributed BIOS 116 may be implemented as a distributed unified BIOS. As used herein, a distributed unified BIOS 116 broadly refers to a BIOS 116 that includes a plurality of BIOS 116 components, or a plurality of BIOS 116 variables, or a plurality of BIOS 116 storage locations, or a combination thereof, which are implemented to function with any of a plurality of processor environments, described in greater detail herein.

In various embodiments, the IHS 100 may be implemented to perform a firmware management operation. As used herein, a firmware management operation broadly refers to any task, function, operation, procedure, or process performed, directly or indirectly, to store, retrieve, aggregate, disaggregate, add, delete, modify, revise, update, replace, or restore one or more individual BIOS 116 components, described in greater detail herein, or one or more individual BIOS 116 variables, likewise described in greater detail herein, or a combination thereof, in one or more memory 112 locations associated with a particular IHS 100. In various embodiments, the firmware management operation may be implemented to include the performance of a derived firmware management operation.

A derived firmware management operation, as used herein, broadly refers to any function, task, procedure, or process performed, directly or indirectly, within a multi-processor operating environment, or an architecture-specific distributed firmware management platform (ASDFMP), both of which are described in greater detail herein, to adaptively adjust current firmware settings for one or more previously-implemented hardware components of an IHS 100, such as its processors, graphics adapters, memory, storage, and so forth, such that derived firmware support is provided to one or more exchanged hardware components whose associated native firmware support is not currently implemented. In various embodiments, one or more derived firmware management operations may be performed to provide interim firmware support for certain hardware components of a particular IHS 100 when a component is exchanged until associated native firmware can be implemented. In certain embodiments, the certain hardware components can include the exchanged hardware component one or more interdependent hardware components, or a combination thereof. In certain embodiments, the firmware management operation may be performed during operation of an IHS 100. In various embodiments, performance of the firmware management operation may result in the realization of improved operation of an IHS 100.

Figure 2:
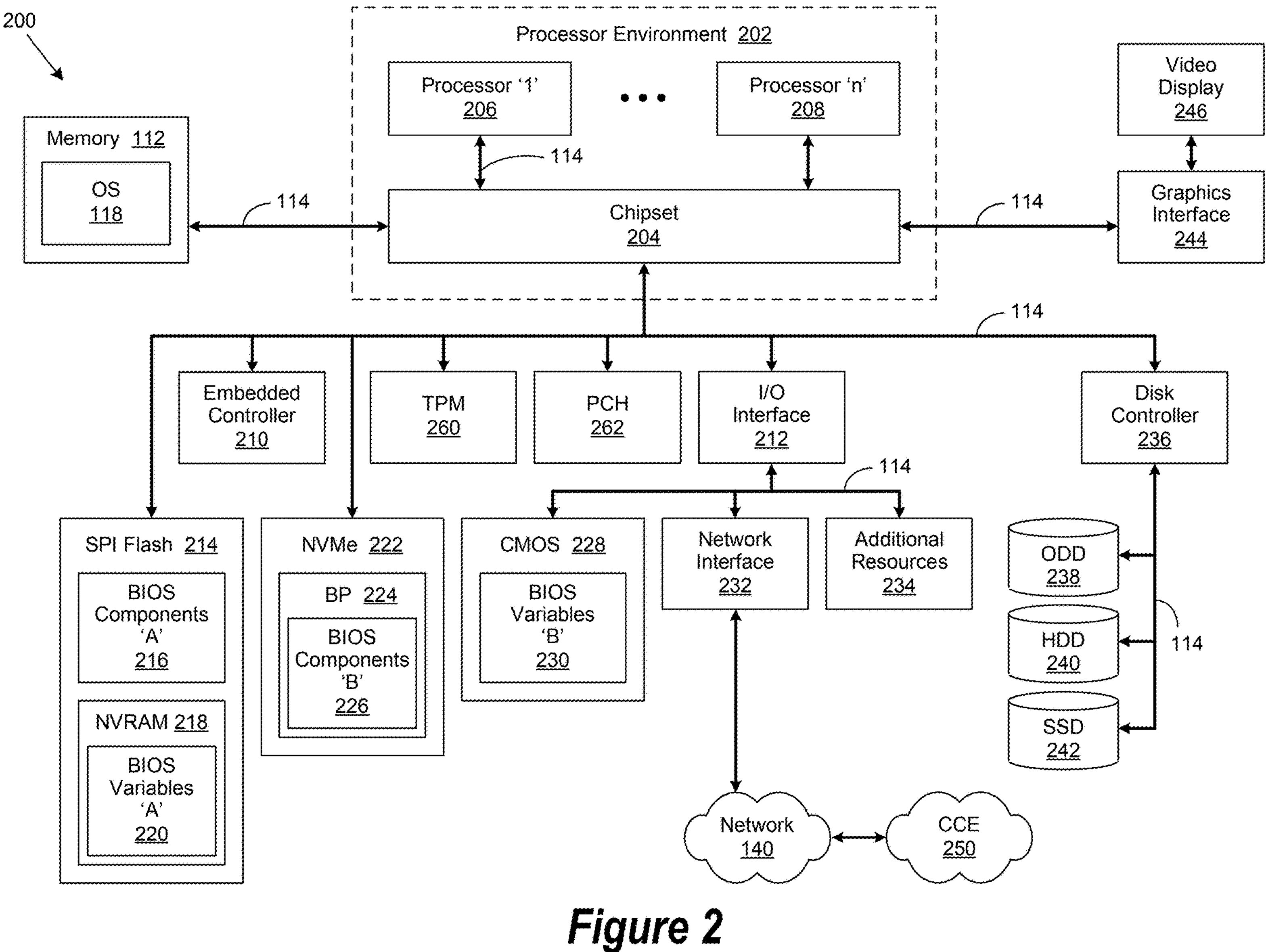
FIG. 2 shows a simplified block diagram of multi-processor operating environment.

FIG. 2 shows a simplified block diagram of multi-processor operating environment implemented in accordance with an embodiment of the invention. As used herein, a multi-processor operating environment 200, such as that shown in FIG. 2, broadly refers to any instrumentality, or aggregate of instrumentalities, that may be implemented to compute, classify, process, transmit, receive, retrieve, originate, switch, store, display, manifest, detect, record, reproduce, handle, or utilize, or a combination thereof, any form of information, intelligence, or data for business, scientific, control, entertainment, or other purpose, through the use of a particular processor environment (PE) 202. For example, the multi-processor environment 200 may be implemented as an information handling system (IHS), described in greater detail herein, such as a personal computer, a laptop computer, a smart phone, a tablet computer or other consumer electronic device, a network server, a network storage device, or other network communication device, and so forth. In various embodiments, a multi-processor operating environment 200 may be implemented to include processing resources for executing machine-executable code, such as a central processing unit (CPU), a programmable logic array (PLA), an embedded device such as a System-on-a-Chip (SoC), or other control logic hardware.

In various embodiments, the multi-processor operating environment 200 may be implemented to include a PE 202. In various embodiments, the PE 202 may be implemented to include a chipset 204 and one or more processors '1' 206 through 'n' 208. In various embodiments, the processors '1' 206 through 'n' 208 implemented within a PE 202 may have the same, or different, architectures. In various embodiments, a chipset 204 may be implemented to support one or more architectures corresponding to the processors '1' 206 through 'n' 208. In various embodiments, the one or more architectures can include an x86 type processor architecture, an Advanced Reduced Instruction Set Computer (RISC) Machines (ARM) type processor architecture, or a combination thereof. In various embodiments, a processor environment implementing an x86 type processor architecture provides an x86 type processor environment. In various embodiments, a processor environment implementing an ARM type processor architecture provides an ARM type processor environment.

As an example, processors '1' 206 through 'n' 208 of a particular PE 202 may be implemented to be the same in a server. In this example, each processor may be assigned to be a resource to one or more derived machines (VMs). As another example, processor '1' 206 may be implemented as a multi-core processor in a graphics work station, while processor 'n' 208 may be implemented a Graphics Processing Unit (GPU), familiar to skilled practitioners of the art.

In various embodiments, each of the processors '1' 206 through 'n' 208 of a particular PE 202 may be implemented to run the same OS 118. Likewise, individual processors '1' 206 through 'n' 208 of a particular PE 202 may be implemented in various embodiments to run a different same OS 118. For example, processor '1' 206 may be implemented to run Microsoft® Windows®, while processor 'n' 208 may be implemented to run a version of Linux®.

In various embodiments, one or more PEs 202 selected from a plurality of PEs 202 may be implemented within the multi-processor operating environment 200. In certain of these embodiments, a particular PE 202 selected from a plurality of PEs 202 may be vendor-specific. In various embodiments, a particular PE 202 selected from a plurality of PEs 202 may be implemented as a System on a Chip (SoC), familiar to those of skill in the art. In various embodiments, the PE 202 may be implemented to include a plurality of vendor-specific SoCs provided by different vendors, or different versions of an SoC provided by the same vendor.

In various embodiments, the multi-processor operating environment 200 may likewise be implemented to include system memory 112. In various embodiments, the system memory 112 may in turn be implemented to include an operating system (OS) 118. In various embodiments, the multi-processor operating environment 200 may be implemented to include an embedded controller (EC) 210, a Trusted Platform Module (TPM) 260, a Platform Controller Hub (PCH) 262, an input/output (I/O) interface 212, a disk controller 236, and a graphics interface 244, or a combination thereof.

In various embodiments, the multi-processor operating environment 200 may likewise be implemented to include Nonvolatile Random Access Memory (NVRAM) 218, Serial Peripheral Interface (SPI) Flash memory 214, Nonvolatile Memory Express (NVMe) 222 memory, and a complementary metal-oxide-semiconductor (CMOS) 228 chip, or a combination thereof. Skilled practitioners of the art will be familiar with NVRAM 218, which in general usage broadly refers to Random Access Memory (RAM) that retains data if power is lost. In various embodiments, NVRAM 218 may be implemented to hold initial processor instructions used to bootstrap an information handling system (IHS), described in greater detail herein. In various embodiments, NVRAM 218 may be implemented in the form of flash memory, such as SPI Flash 214 memory, Erasable Programmable Read-Only Memory (EPROM), Electrically Erasable Programmable Read-Only Memory (EEPROM), or Ferroelectric RAM (F-RAM), Magnetoresistive RAM (MRAM), Phase-Change RAM (PRAM), or a combination thereof.

Those of skill in the art will likewise be familiar with SPI Flash 214 memory, which is a type of EEPROM memory implemented in accordance with the SPI standard, where the data stored within it is architecturally arranged in blocks. Various embodiments of the invention reflect an appreciation that while data stored within SPI Flash memory 214 is erased at the block level, it may be read or written at the byte level. Likewise, various embodiments of the invention reflect an appreciation that the ability to erase blocks of data within SPI Flash 214 memory may be advantageous in certain embodiments as erase speeds can be improved, and as a result, allow information to be stored more efficiently and compactly.

Likewise, skilled practitioners of the art will be familiar with NVMe, which is an open, logical device interface specification for accessing non-volatile storage media implemented within an IHS. Certain embodiments of the invention reflect an appreciation that NVMe 222 memory is currently available in various form factors, such as solid state drives (SSDs), Peripheral Component Interconnect Express (PCIe) memory cards, and M.2 memory cards. Various embodiments of the invention likewise reflect an appreciation that NVMe, as a logical device interface, is able to support low latency and internal parallelism for solid state storage devices, which can reduce Input/Output (I/O) overhead while providing other known performance improvements.

In various embodiments, the SPI Flash 214 memory may be implemented to receive, store, manage, and provide access to one or more Basic Input/Output System (BIOS) components 'A' 216. As used herein, a BIOS component broadly refers to one or more discrete portions of firmware program code that may be used, directly or indirectly, by a BIOS during its operation. In various embodiments, the SPI Flash 214 memory may be implemented to include certain NVRAM 218 memory. In various embodiments, the NVRAM 218 memory may in turn be implemented to receive, store, manage, and provide access to one or more BIOS variables 'A' 220, such as configuration settings, for use by the BIOS of an associated IHS.

In various embodiments, the NVMe 222 memory may be implemented to include a boot partition (BP) 224. Those of skill in the art will be familiar with the concept of a BP 224, which in common usage broadly refers to a primary memory partition that contains a boot loader, which is a portion of program code responsible for booting the OS 118 of an associated IHS. In various embodiments, the BP 224 may in turn be implemented to receive, store, manage, and provide access to one or more BIOS components 'B' 226. In various embodiments, the NVMe 222 memory may be implemented without a BP 224. Nonetheless, the NVMe 222 memory may be implemented in certain of these embodiments to still receive, store, manage, and provide access to one or more BIOS components 'B' 226.

In various embodiments, the I/O interface 212 may be implemented to interact with a complementary metal-oxide semiconductor (CMOS) 228 chip. In various embodiments, the CMOS 228 chip may be implemented to include a real-time clock and RAM memory that is backed-up by a battery. In various embodiments, the memory in the CMOS 228 chip may be implemented to receive, store, manage, and provide access to one or more BIOS variables 'B' 230.

In various embodiments, the I/O interface 212 may likewise be implemented to interact with a network interface 232, or additional resources 234, or both. In various embodiments, the network interface 232 may be implemented to provide access and connectivity to a network 140. In turn, the network 140 may be implemented in various embodiments to provide access and connectivity to a cloud computing environment (CCE) 250. Skilled practitioners of the art will be familiar with cloud computing, which is defined by the National Institute of Standards and Technology (NIST) as a model for enabling ubiquitous, convenient, on-demand network access to a shared pool of configurable computing resources (e.g., networks, servers, storage, applications, portions of program code, firmware components, data, services, and so forth) that can be rapidly provisioned and released with minimal management effort or service provider interaction.

In various embodiments, additional resources 234 may include a data storage system, additional graphics interfaces, a network interface card (NIC), a sound or video processing card, and so forth. In various embodiments, additional resources 234 may be implemented on a main circuit board of an IHS, or a separate circuit board or add-in card thereof, or a device that is external to the IHS, or a combination thereof. In various embodiments, the disk controller 236 may be implemented to interact with, and manage access to and from, an optical disk drive (ODD) 238, a hard disk drive (HDD) 240, or a solid state drive (SSD) 242, or a combination thereof.

In various embodiments, the graphics interface 242 may be implemented to present visual content on an associated video display. In certain of these embodiments, the graphics interface 242 may likewise be implemented to receive user gesture input from the video display 244, such as through the use of a touch-sensitive screen. In various embodiments, the system memory 112, the chipset 204, one or more processors '1' 206 through 'n' 208, the EC 210, the TPM 260, the PCH 262, the SPI Flash 214 memory, the NVMe 222 memory, the I/O interface 212, the CMOS 228 chip, the network interface 232, the additional resources 234, the disk controller 236, the ODD 238, the HDD 240, the SSD 242, the graphics interface 244, and the video display 246 may be implemented to provide and receive data to and from one another via one or more buses 114.

In various embodiments, a firmware management operation may be implemented to include a distributed firmware management operation. As used herein, a distributed firmware management operation broadly refers to a firmware management operation, described in greater detail herein, performed directly, or indirectly, within a multi-processor operating environment 200 to store, retrieve, aggregate, disaggregate, add, delete, modify, revise, update, replace, or restore one or more BIOS components 'A' 216 or 'B' 226, or one or more BIOS variables 'A' 220 or 'B' 230, or a combination thereof. In various embodiments, one or more BIOS components 'A' 216 or 'B' 226, or one or more BIOS variables 'A' 220 or 'B' 230, or a combination thereof, may be used, individually or in combination with one another, in the performance of a distributed firmware management operation. In various embodiments, performance of the distributed firmware management operation effectively decouples (i.e., minimizes the interrelationship between) one or more BIOS components 'A' 216 or 'B' 226, or one or more BIOS variables 'A' 220 or 'B' 230, or a combination thereof, from each other. In various embodiments, the performance of the distributed firmware management operation effectively decouples PE BIOS components from other platform BIOS components, as described herein.

In various embodiments, individual BIOS components 'A' 216 or 'B' 226 used in the performance of one or more distributed firmware management operations may be located within, or outside of, the multi-processor operating environment 200. As an example, a particular BIOS component 'A' 216 or 'B' 226 may initially be stored within a cloud computing environment (CCE) 250, described in greater detail herein. In this example, the firmware component may be retrieved from the CCE 250 by the multi-processor operating environment 200 and then respectively stored as firmware components 'A' 216 in NVRAM 218, or 'B' 226 in NVMe 222 memory, or a combination of the two.

Figure 3:
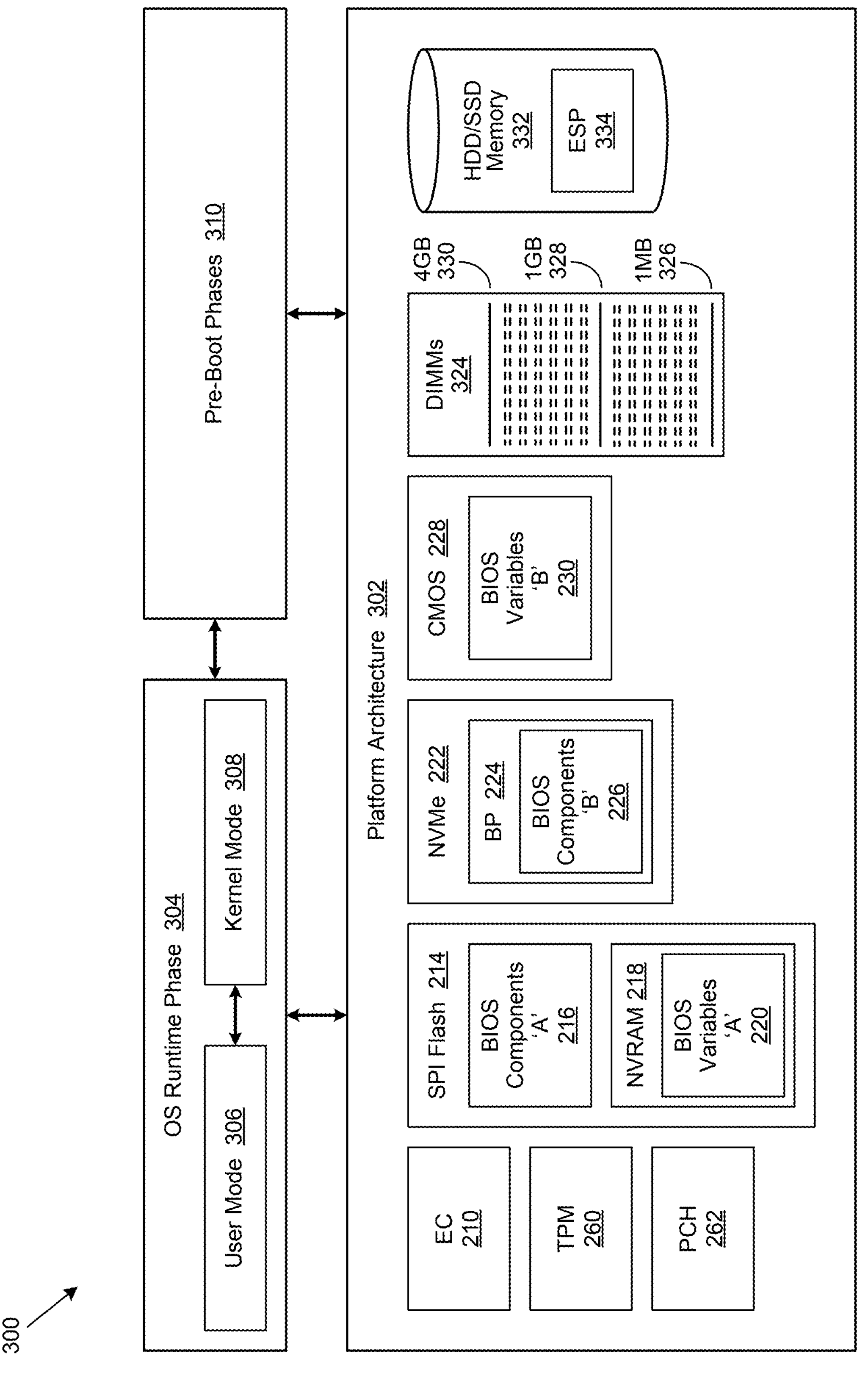
FIG. 3 shows a simplified block diagram of an architecture-specific distributed firmware management platform.

FIG. 3 shows a simplified block diagram of an architecture-specific distributed firmware management platform implemented in accordance with an embodiment of the invention. In various embodiments, the architecture-specific distributed firmware management platform (ASDFMP) 300, and its associated operation, may be implemented to accommodate architecture-specific aspects of a particular information handling system (IHS), described in greater detail herein. As an example, various IHS's may utilize different processors (e.g., Intel®, AMD®, Qualcom®, Broadcom®, NVidia®, and so forth), and as a result, may require the use of a Basic Input/Output System (BIOS) specific to their respective architecture, or associated operating system (OS), or both, at boot time. In various embodiments, the ASDFMP 300 may be implemented to perform one or more firmware management operations, described in greater detail herein.

In various embodiments, the ASDFMP 300 may be implemented to include a platform architecture 302. In certain of these embodiments, the platform architecture 302 may be implemented to include an embedded controller (EC) 210, a Trusted Platform Module (TPM) 260, a Platform Controller Hub (PCH) 262, Serial Peripheral Interface (SPI) Flash 214 memory, Nonvolatile Memory Express (NVMe) 222 memory, and a complementary metal-oxide-semiconductor (CMOS) 228 chip, or a combination thereof, each of which may be considered a component of an information handling system (IHS), as described in greater detail herein. In various embodiments, the platform architecture 302 may likewise be implemented to include one or more dual in-line memory modules (DIMMs) 324, and certain hard disk drive (HDD) memory, or solid state drive (SSD) memory, or a combination of the two 332.

In various embodiments, the EC 210 may be implemented, directly or indirectly, within the ASDFMP 300 to provide a root of trust function. As used herein, a root of trust broadly refers to a highly reliable component, such as an EC 210, that performs specific, important security functions. In various embodiments, a root of trust component may be implemented as a building block upon which other components of the ASDFMP 300 can derive security functions.

In various embodiments, the EC 210 may be implemented to perform a root of trust operation. As used herein, a root of trust operation broadly refers to a distributed firmware management operation, described in greater detail herein, performed directly, or indirectly, within an ASFDMP 300 to provide a root of trust by leveraging a secure interface to ensure integrity and security of communication between certain components of the ASDFMP 300. In various embodiments, one or more root of trust operations may be performed to enhance the security and trustworthiness of the ASDFMP 300.

Skilled practitioners of the art will be familiar with a TPM 260, which is an international standard for a secure crypto processor, typically implemented as a dedicated microcontroller designed to secure various hardware components of an ASDFMP 300 through the use of integrated cryptographic keys. In various embodiments, a TPM 260 may be implemented to increase the security of an ASDFMP 300 and to protect it against certain firmware attacks. In various embodiments, a TPM 260 may be implemented in combination with an EC 210 to perform a root of trust operation.

Those of skill in the art will likewise be familiar with a PCH 262, which broadly refers to a family of chipsets manufactured by Intel® to control certain data paths and support functions used in conjunction with Intel® processors. However, as used herein, a PCH 262 may broadly refer to one or more processor-agnostic functionalities of an ASDFMP 300 that may be used, directly or indirectly within it, to control various data paths and support functions associated with a particular processor. Examples of such processors include those manufactured by Intel®, AMD®, Qualcomm®, Broadcom®, NVidia®, and so forth. Accordingly, various embodiments of the invention reflect an appreciation that provision of such PCH 262 functionalities may require a different implementation for each processor architecture.

In various embodiments, the SPI Flash 214 memory may be implemented to receive, store, manage, and provide access to one or more BIOS components 'A' 216, as described in greater detail herein. In various embodiments, the SPI Flash 214 memory may likewise be implemented to include certain NVRAM 218 memory. In various embodiments, the NVRAM 218 memory may in turn be implemented to receive, store, manage, and provide access to one or more BIOS variables 'A' 220, as described in greater detail herein.

In various embodiments, the NVMe 222 memory may be implemented to include a boot partition (BP) 224, described in greater detail herein. In various embodiments, the BP 224 may in turn be implemented to receive, store, and provide access to, one or more BIOS components 'B' 226. In various embodiments, the NVMe 222 memory may be implemented without a BP 224. Nonetheless, the NVMe 222 memory may be implemented in certain of these embodiments to still receive, store, manage, and provide access to one or more BIOS components 'B' 226. In various embodiments, as likewise described in greater detail herein, the CMOS 228 chip may be implemented to receive, store, and provide access to, one or more BIOS variables 'B' 230.

In various embodiments, the one or more DIMMs 324 may be implemented to include one or more RAM modules mounted onto an integrated circuit board. In various embodiments, the one or more DIMMs 324 may be partitioned into a low region of memory, such as from 1 megabyte (MB) 326 to 1 gigabyte (GB) 328, and a high region of memory, such as from 1 GB 328 to 4 GB 330. In these embodiments, the amount of memory allocated to the low and high memory regions, the memory addresses within the one or more DIMMs 324 where such allocation may occur, and how such allocation may be performed, is a matter of design choice.

In various embodiments, the HDD/SDD memory 332 may be implemented to include an extensible firmware interface (EFI) system partition (ESP) 334. Skilled practitioners of the art will be familiar with an ESP 334, which is usually implemented as a partition on a mass storage device, such as HDD/SSD memory 332, which in turn is used by an associated IHS implemented with a Unified Extensible Firmware Interface (UEFI), described in greater detail herein. In such implementations, the UEFI loads files stored within the ESP 334 to begin installing Operating System (OS) and associated utility files. In various embodiments, the ESP 334 may be implemented to contain the boot loaders, or kernel images, for all installed OS's that may be contained in other memory partitions, device driver files for hardware devices present in its associated IHS and used by the firmware at boot time, system utility programs that are intended to be run before a particular OS is booted, and data files such as error logs.

In various embodiments, the ASDFMP 300 may be implemented to include an OS runtime phase 304, and various pre-boot phases 310, all of which are described in greater detail herein. In various embodiments, the OS runtime phase 304 may be implemented to include a user mode 306 and a kernel mode 308, both of which are likewise described in greater detail herein. In various embodiments, certain components, processes, or operations, or a combination thereof, respectively associated with the OS runtime phase 304 and the pre-boot phases 310, may be implemented to interact with various components of the platform architecture 302, as likewise described in greater detail herein.

Figure 4A:
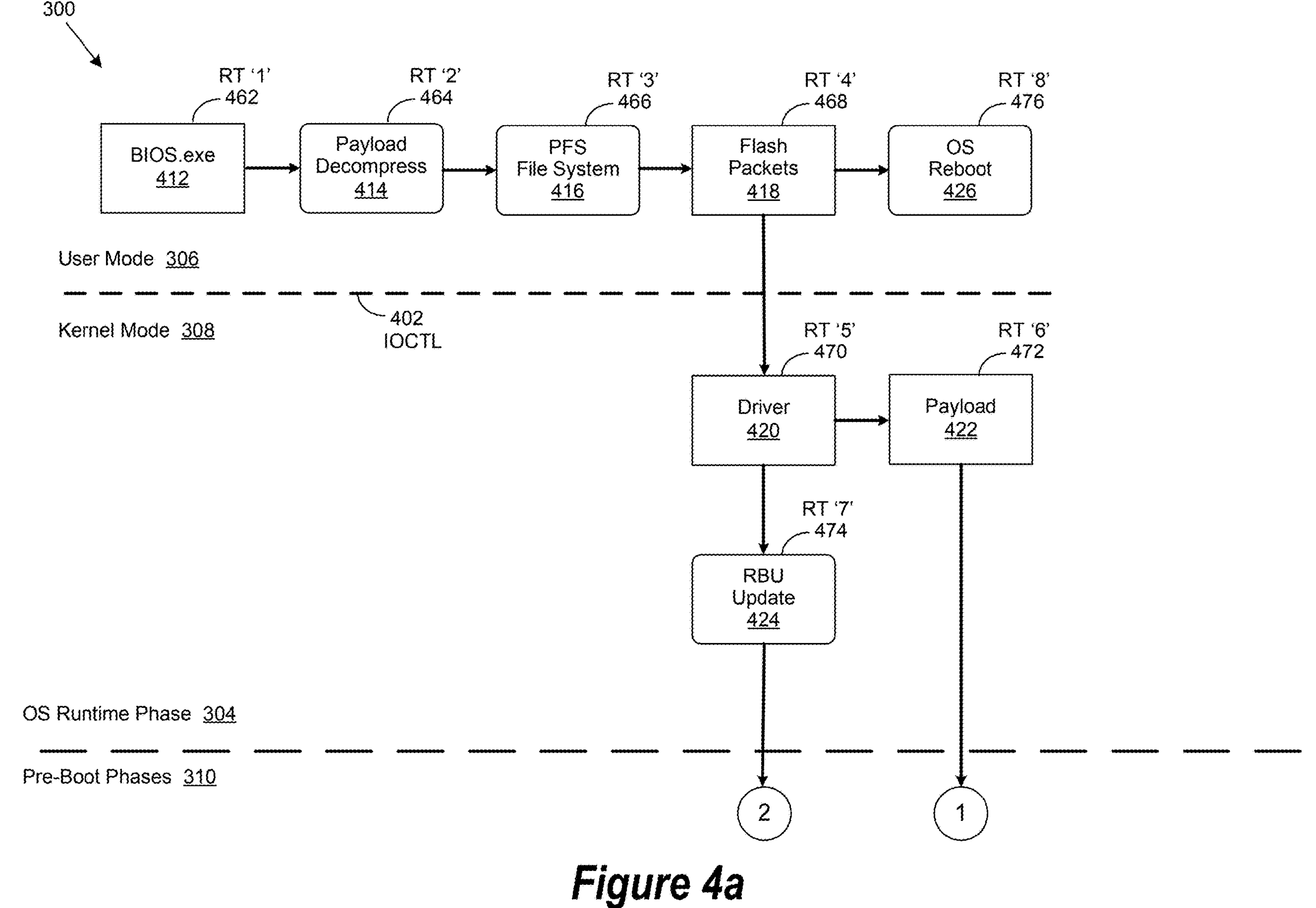
FIGS. 4*a* through 4*c* are a simplified block diagram showing the performance of certain distributed firmware management operations.
Figure 4B:
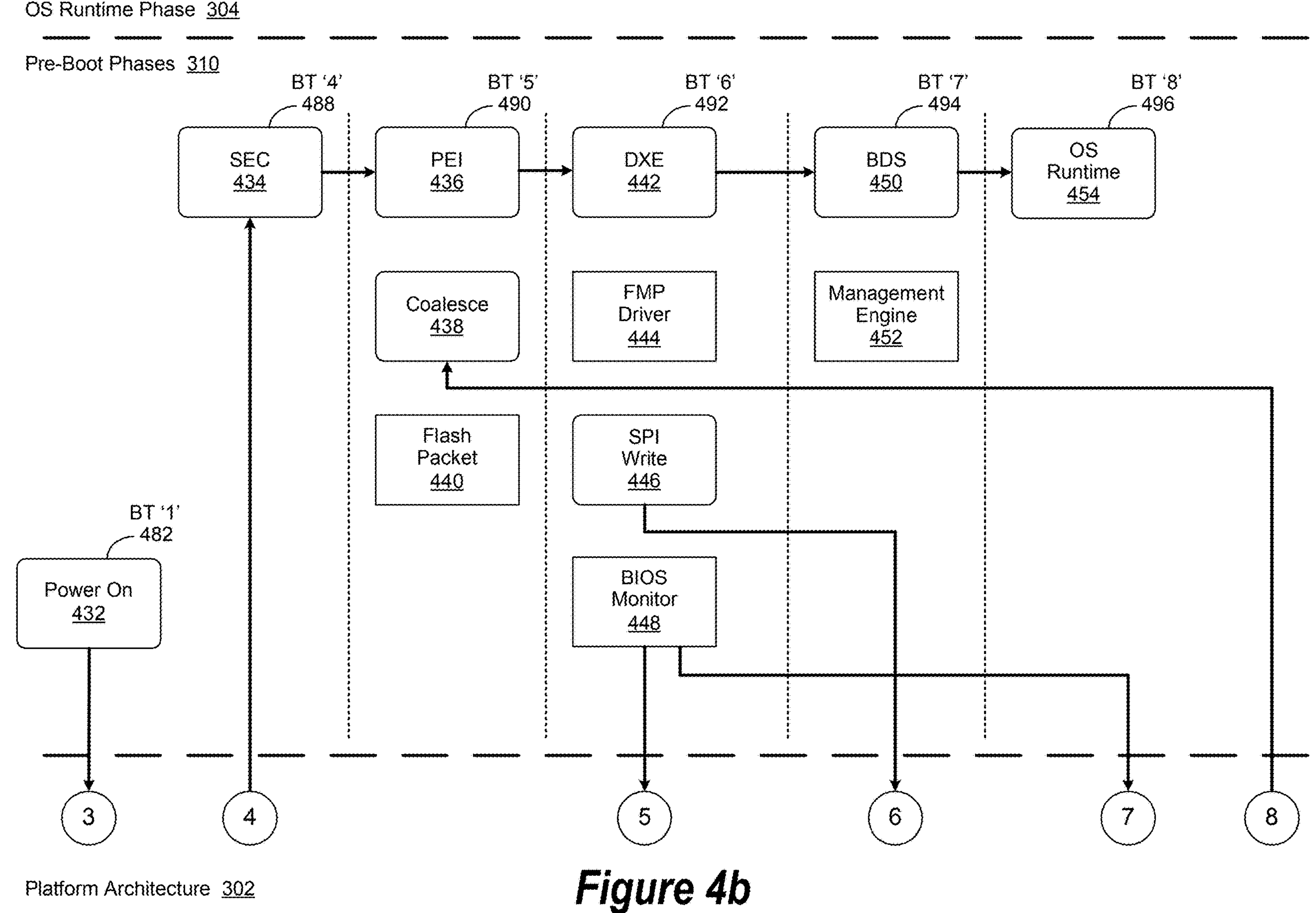
Figure 4C:
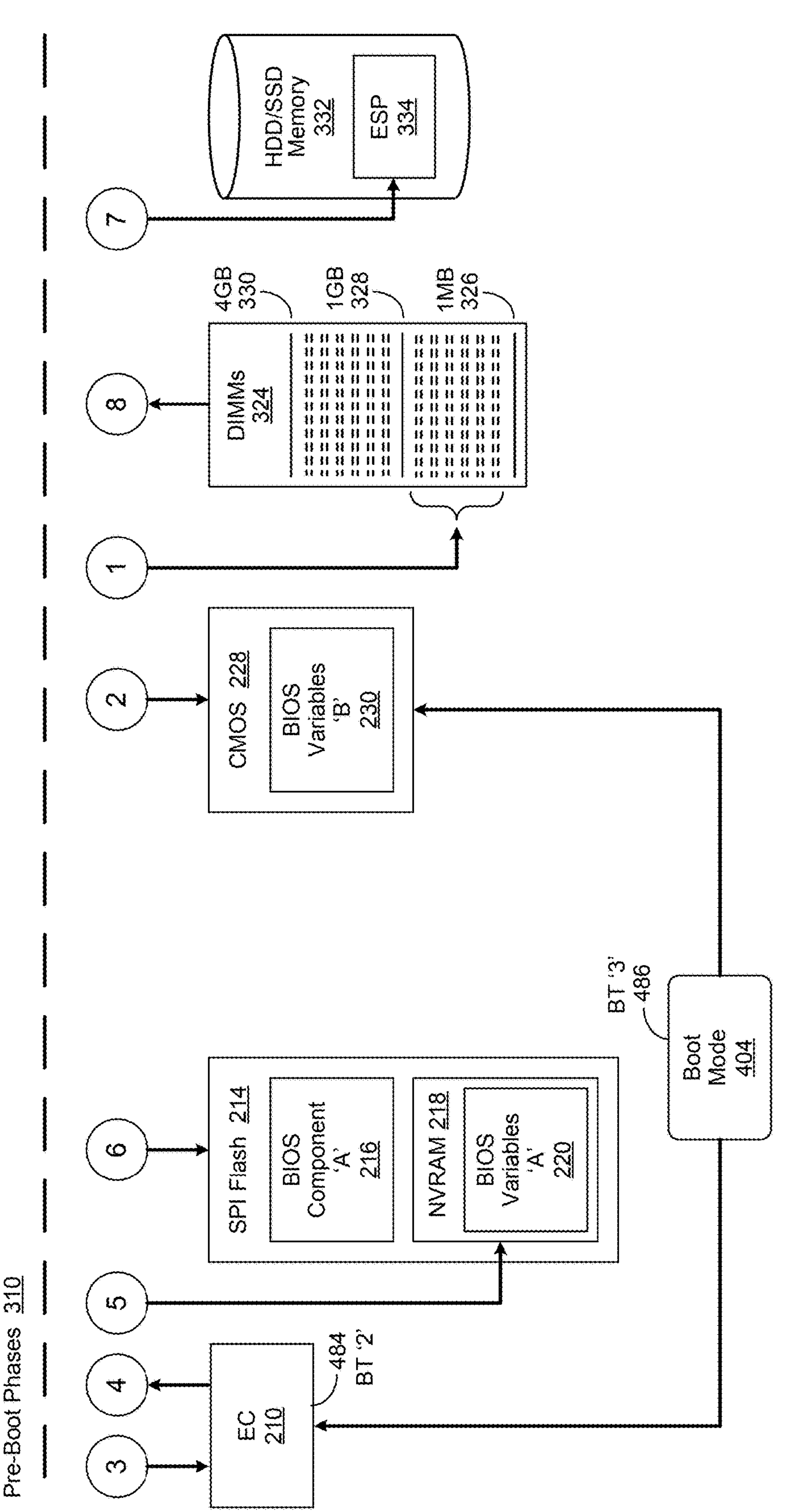

FIGS. 4*a* through 4*c* are a simplified block diagram showing an architecture-specific distributed firmware management platform (ASDFMP) implemented in accordance with an embodiment of the invention to perform certain distributed firmware management operations. In certain embodiments, the ASDFMP 300 may be implemented to include an Operating System (OS) runtime phase 304, various pre-boot phases 310, and a platform architecture 302. In various embodiments, as described in greater detail herein, the platform architecture 302 may be implemented to include an embedded controller (EC) 210, Serial Peripheral Interface (SPI) Flash 214 memory, and a complementary metal-oxide-semiconductor (CMOS) 228 chip, or a combination thereof. In various embodiments, the platform architecture 302 may likewise be implemented to include one or more dual in-line memory modules (DIMMs) 324, and certain hard disk drive (HDD) memory, or solid state drive (SSD) memory, or a combination of the two 332.

In various embodiments, the SPI Flash 214 memory may be implemented to receive, store, manage, and provide access to one or more Basic Input/Output System (BIOS) components 'A' 216, described in greater detail herein. In various embodiments, the SPI Flash 214 memory may likewise be implemented to include certain NVRAM 218 memory, likewise described in greater detail herein. In various embodiments, the NVRAM 218 memory may in turn be implemented to receive, store, manage, and provide access to one or more BIOS variables 'A' 220, as described in greater detail herein.

In various embodiments, the OS runtime phase 304 may be implemented to include a user mode 306 and a kernel mode 308. Skilled practitioners of the art will be aware that user mode 306 generally refers to a restricted mode that limits software access to system resources, while kernel mode 308 generally refers to a privileged mode that allows software to access system resources and perform privileged operations. In various embodiments, an Input/Output Control (IOCTL) 402 operation, familiar to those of skill in the art, may be performed to switch between user mode 306 and kernel mode 308. Those of skill in the art will likewise be aware that such mode switching generally involves saving the current context of an associated information handling system's (IHS's) processor in memory, switching to the new mode, and loading the new context into the processor.

Referring now to FIG. 4*a*, a distributed firmware management operation may be initiated by the ASDFMP 300 receiving a BIOS.exe 412 file in runtime (RT) step '1' 462. In various embodiments, the BIOS.exe 412 file may be implemented as the combination of a flash memory utility and a payload of firmware components, described in greater detail herein. Then, in RT step '2' 464 the BIOS.exe 412 is executed to decompress 414 its payload, which is then converted in RT step '3' 466 into a payload file system (PFS) 416.

Flash memory packets 418 are then extracted from the PFS 416 if RT step '4' 468 and provided to a memory driver 420 in RT step '5' 470 to create a memory payload 422. The resulting memory payload 422 is then loaded into a lower memory region of one or more DIMMs 324, such as between 1 megabyte (MB) 326 and 1 gigabyte (GB) 328. Thereafter, a Remote BIOS Update (RBU) 424 operation may be performed in RT step '7' to update certain BIOS variables 'B' 230 stored in the CMOS 328 chip. An OS reboot 426 operation is then performed in RT step '8' 476.

Once the OS reboot 426 operation has been performed in RT step '8' 476, power is applied 432 to the ASDFMP 300 in pre-boot time (BT) step '1' 432. An embedded controller (EC) 210 is then invoked in BT step '2' 464 which results in the activation of a boot mode 404 in BT step '3' 486. In various embodiments, the boot mode 404 may be activated in BT step '3' 486 by retrieving, and using, certain BIOS variables 'B' stored in the CMOS 228 chip.

One or more security (SEC) 434 phase operations may then be performed in BT step '4' 488, followed by the performance of one or more Pre Extensible Firmware Interface (EFI) Initialization (PEI) 436 phase operations in BT step '5' 490. In various embodiments, the one or more SEC 434 phase operations may be implemented to secure the boot process by preventing the loading of Unified Extensible Firmware Interface (UEFI) drivers, or boot loaders, that are not signed with an acceptable digital signature. In various embodiments, a trusted platform module (TPM), familiar to skilled practitioners of the art, may be used in the performance of one or more SEC 434 phase operations.

Those of skill in the art will likewise be aware that PEI 436 phase operations are generally performed to initialize permanent memory within a particular IHS to load and invoke initial configuration routines specific to its associated processor environment (PE), described in greater detail herein. In various embodiments, performance of the PEI 436 phase operation in BT step '5' 490 may include one of more packet coalescing 438 operations being performed to coalesce individual flash memory packets previously stored in a low memory region of one or more DIMMs in RT step '6' 472. In various embodiments, the individual flash memory packets may then be stored as one or more coalesced flash memory packets 440.

In various embodiments, a firmware management protocol (FMP) may be used in the performance of a Driver eXecution Environment (DXE) 442 phase operation in BT step 6' 492 to perform an SPI write 446 operation to write the coalesced flash memory packets 440 to SPI Flash 214 memory. Skilled practitioners of the art will be familiar with a DXE 442, which as typically implemented includes a DXE Core, a DXE Dispatcher, and one or more Firmware Management Protocol (FMP) drivers 444. In general, the DXE Core component is responsible for producing a set of boot services, DXE services, and RT Services. Likewise, the DXE Dispatcher component is responsible for discovering and executing FMP drivers 444 in the correct order. In turn, the FMP drivers 444 are responsible for initializing the IHS's processor environment (PE), described in greater detail herein. In various embodiments, the SPI write 446 operation may be performed to write certain flash memory packets associated with certain BIOS components 'A' 216, or certain BIOS variables 'A' 220, or a combination of the two. In various embodiments, the flash memory packets may contain new, updated, modified, revised, or replacement BIOS components 'A' 216, or BIOS variables 'A' 220, or a combination of the two.

In various embodiments, a BIOS monitor 448, such as BIOS IQ, produced by Dell® Incorporated, of Round Rock, Texas, may be implemented within the DXE 442 phase to monitor the current values of certain BIOS variables 'A' 220 stored in NVRAM 218, which in certain embodiments, may be implemented within SPI Flash 214 memory. In various embodiments, the BIOS monitor 448 may likewise be implemented to monitor the status of certain data stored in the ESP 334, described in greater detail herein. Once DXE 442 phase operations are completed in BT step '6' 494, the OS is then booted. In various embodiments, a boot device selection (BDS) 450 phase operation is then performed in BT step '7' 494 to select a boot device. In various embodiments, a management engine (ME) 452, such as the ME 452 produced by Intel® Corporation of Santa Clara, California, may be implemented to use the selected boot device in BT step '8' 496 to boot the ASDFMP 300 into an OS runtime 454 state.

Figure 5:
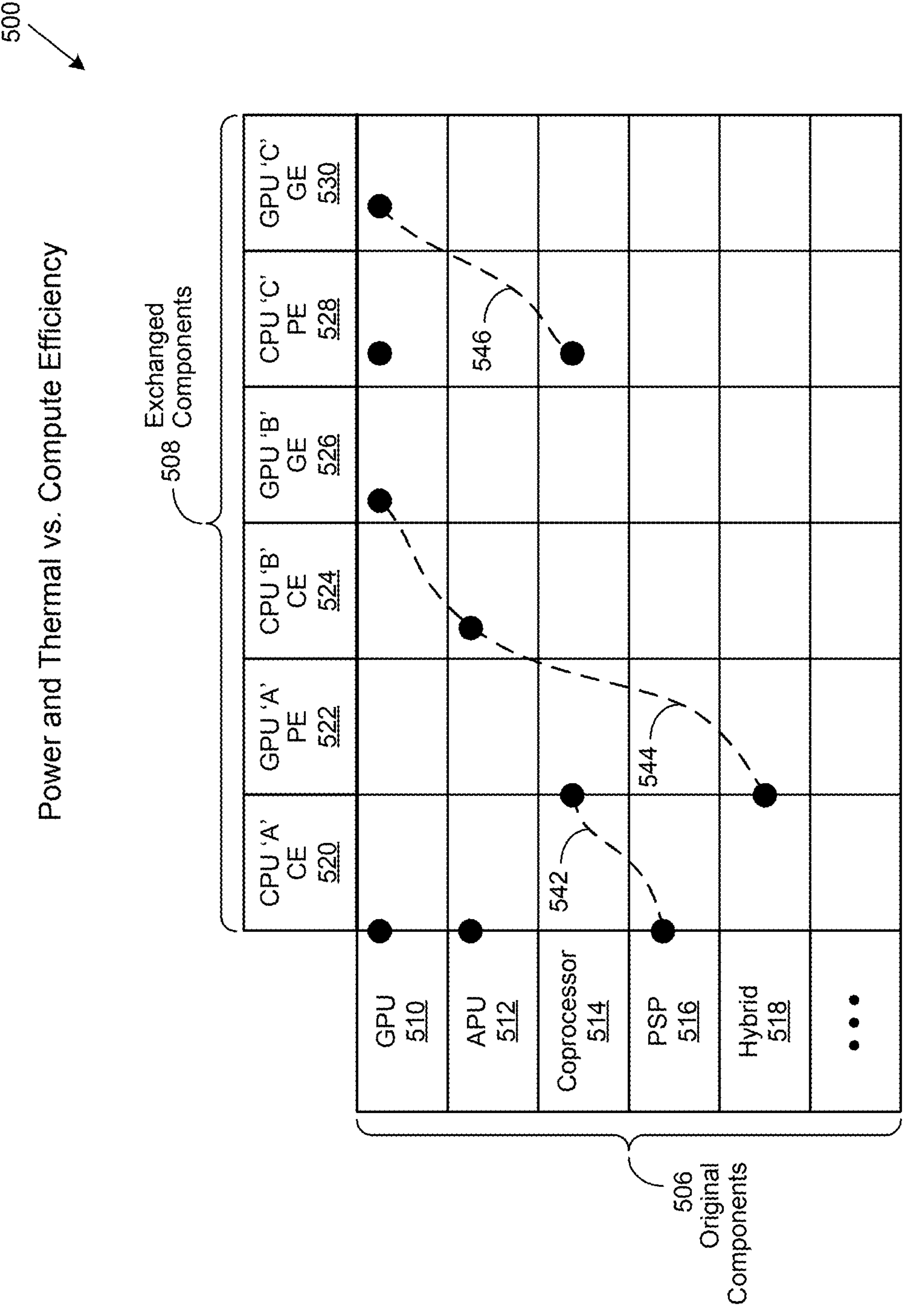
FIG. 5 is a table showing variances in thermal and power behaviors resulting from certain hardware components of an information handling system being exchanged, or replaced.

FIG. 5 is a table showing variances in thermal and power behaviors resulting from certain hardware components of an information handling system being exchanged, or replaced. Various aspects of the invention reflect an appreciation that it is common for manufacturers or vendors to provide an information handling system (IHS) that has default hardware components, or customer-configurable hardware configurations, or both. Likewise, various aspects of the invention reflect an appreciation that it is also common for customers to exchange, or replace, certain IHS hardware components. For example, a video graphics card based on one manufacturer's (e.g., Intel®) processor may be switched out for a different video graphics based on another manufacturer's (e.g., NVIDIA®) processor. As another example, the number of Dual Inline Memory Modules (DIMMs) may be increased or decreased, using components from a different manufacturer. Accordingly, situations may arise where firmware support may not be available for the reconfigured IHS.

To elaborate on the preceding examples, various aspects of the invention reflect an appreciation that exchanged IHS hardware components 508 may not have built-in firmware drivers. As a result, the absence of such firmware drivers may result in unexpected or continuous system reboots, variances in expected power and thermal gradients, and other unexpected behaviors. Accordingly, changes in an IHS's original hardware component 506 configuration may lead to system instability and diminished performance due to associated workload configurations. Furthermore, such change may likewise lead to complications related to system maintenance and management.

Referring now to the power and thermal behavior table 500 shown in FIG. 5, an IHS may have been implemented with original hardware components 506, such as a graphics processing unit (GPU) 510, an Accelerated Processing Unit (APU) 512, a coprocessor 514, a Platform Security Processor (PSP) 516, or a hybrid processor 518, or a combination thereof. In various embodiments, one or more of the original hardware components 506 may be replaced by a corresponding exchanged hardware components 508, such as Central Processing Unit (CPU) 'A' 520, GPU 'A' 522, CPU 'B' 524, GPU 'B' 526, CPU 'C' 528, GPU 'C' 530, and so forth. As a result, the compute efficiency (CE), power efficiency (PE), or graphics efficiency (GE) of the IHS may be adversely affected unless interim firmware support for the corresponding exchanged hardware component 508 is implemented.

For example, CPU 'A' 520 and GPU 'A' 522 may be exchanged for an originally-implemented PSP 510 hardware component. As a result, the CE and PE of the IHS may be adversely affected unless derived firmware support is provided 542 on an interim basis until native firmware support for CPU 'A' 520 and GPU 'A' 522 is implemented. As another example, CPU 'B' 524 and GPU 'B' 526 may be exchanged for an originally-implemented hybrid processor 518 hardware component. As a result, the CE and GE of the IHS may be adversely affected unless derived firmware support is provided 544 on an interim basis until native firmware support for CPU 'B' 524 and GPU 'B' 526 is implemented. As yet another example, GPU 'C' 530 may be exchanged for an originally-implemented coprocessor 514 hardware component. As a result, the GE of the IHS may be adversely affected unless derived firmware support is provided 546 on an interim basis until native firmware support for GPU 'C' 530 is implemented.

Figure 6:
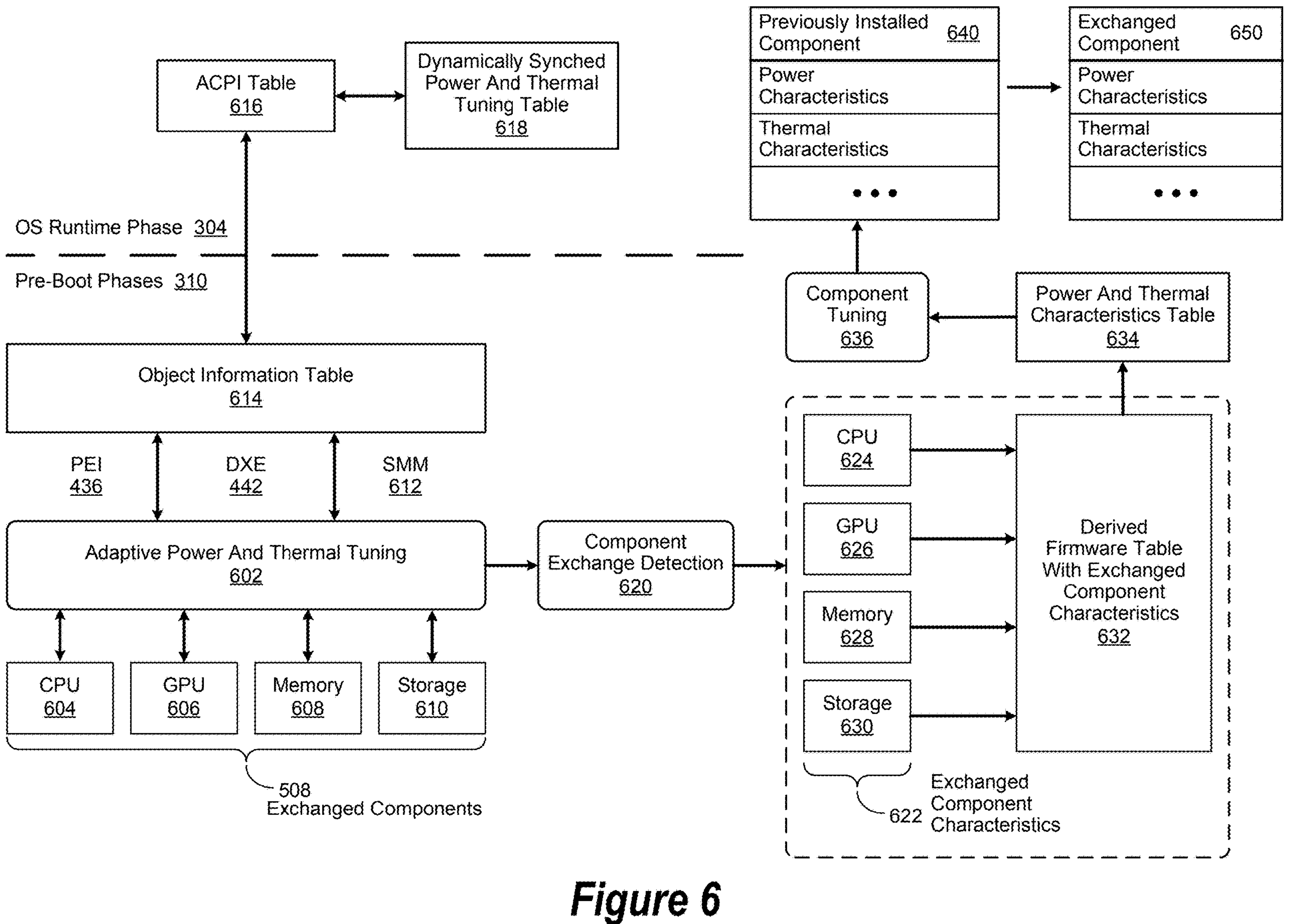
FIG. 6 is a simplified block diagram showing the use of a derived firmware table to perform a derived firmware management operation.
Figure 7A:
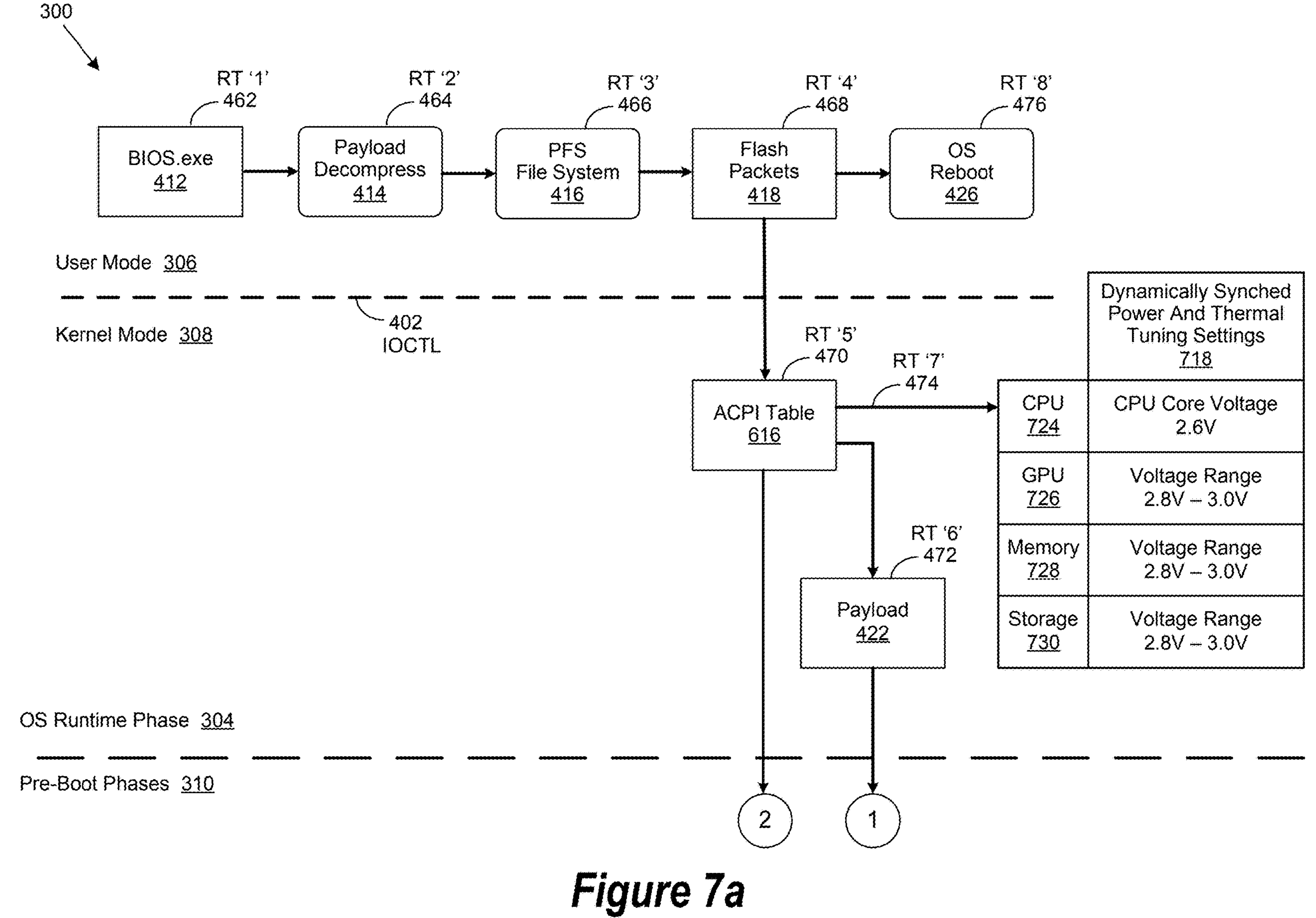
FIGS. 7*a* through 7*d* are a simplified block diagram showing the performance of certain derived firmware management operations to provide interim firmware functionality for an exchanged hardware component.
Figure 7B:
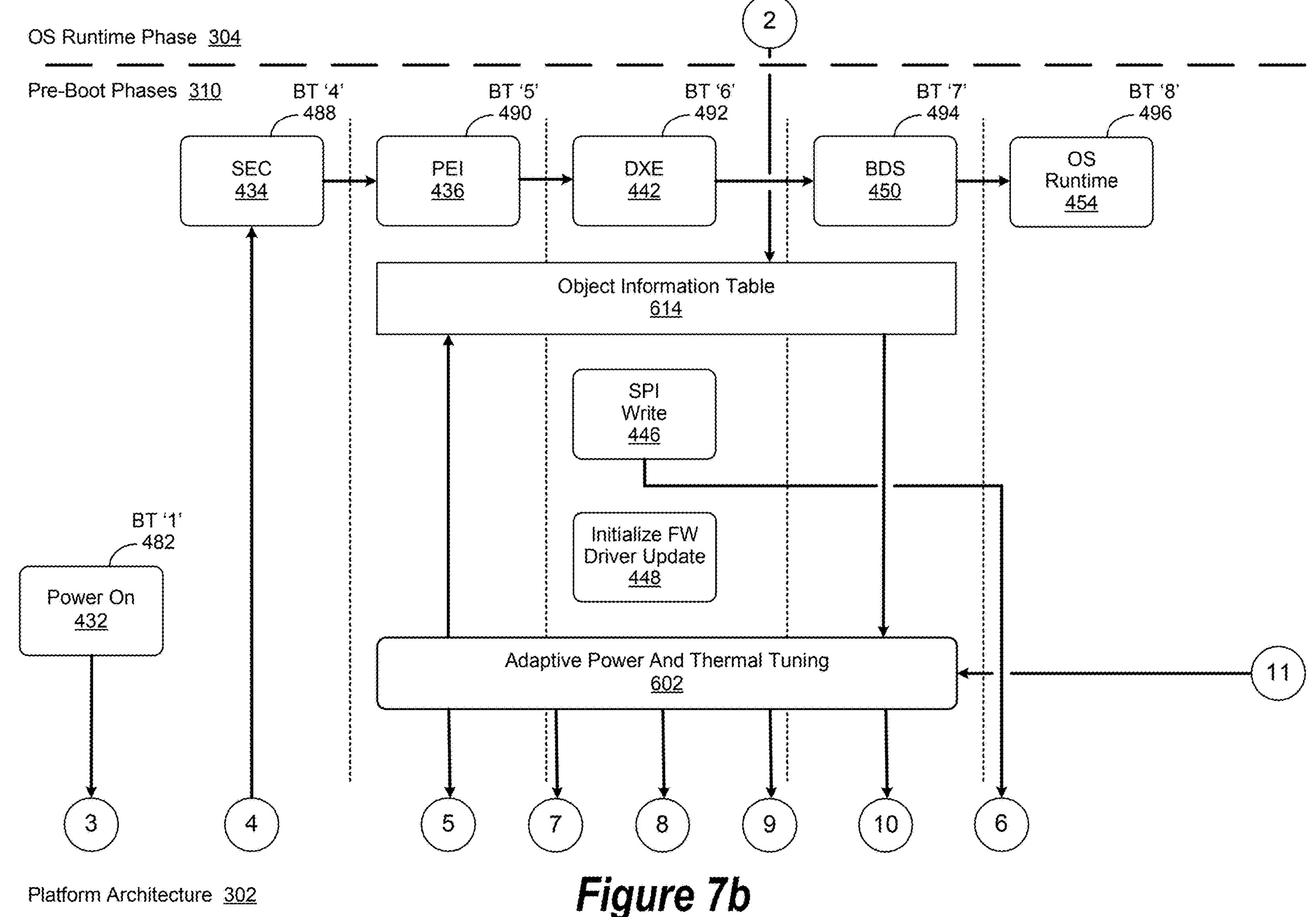
Figure 7C:
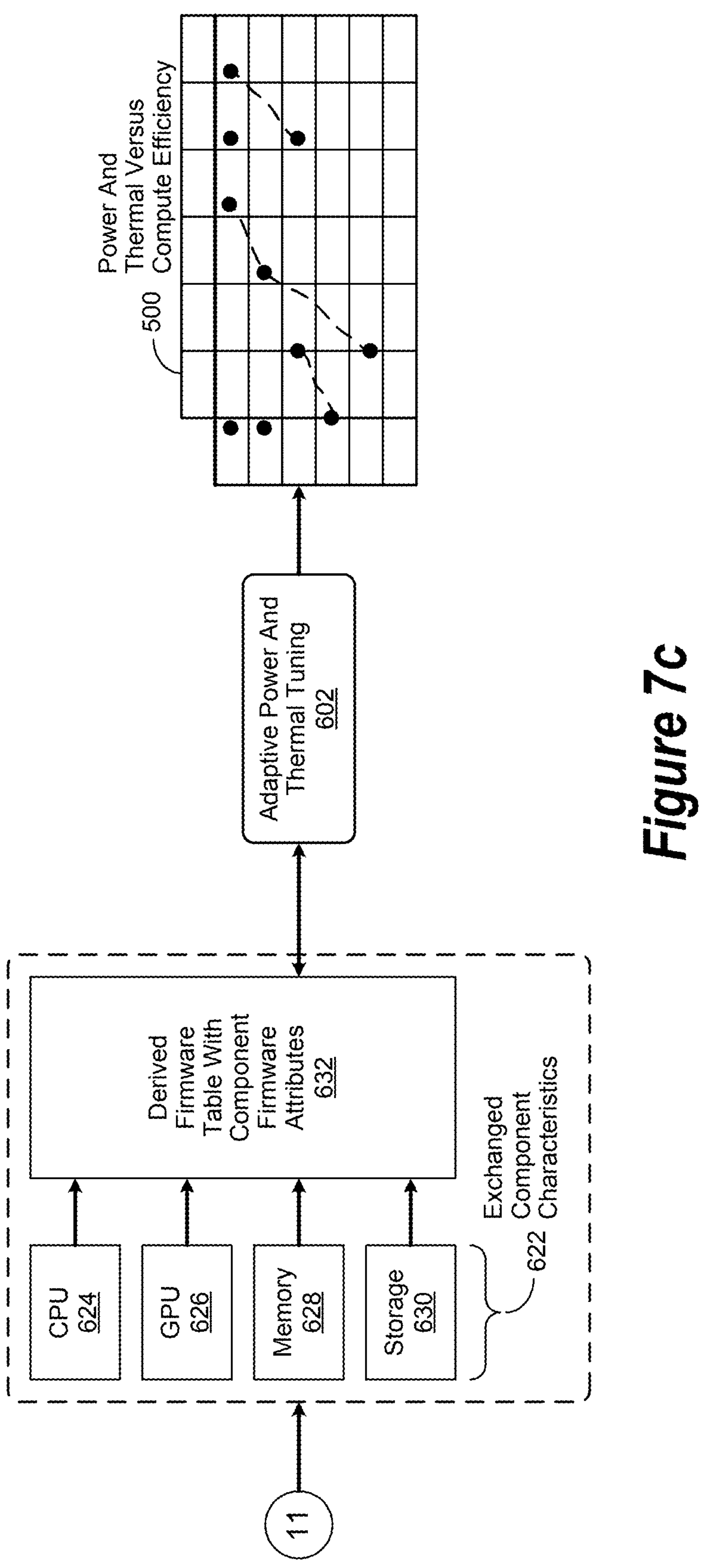
Figure 7D:
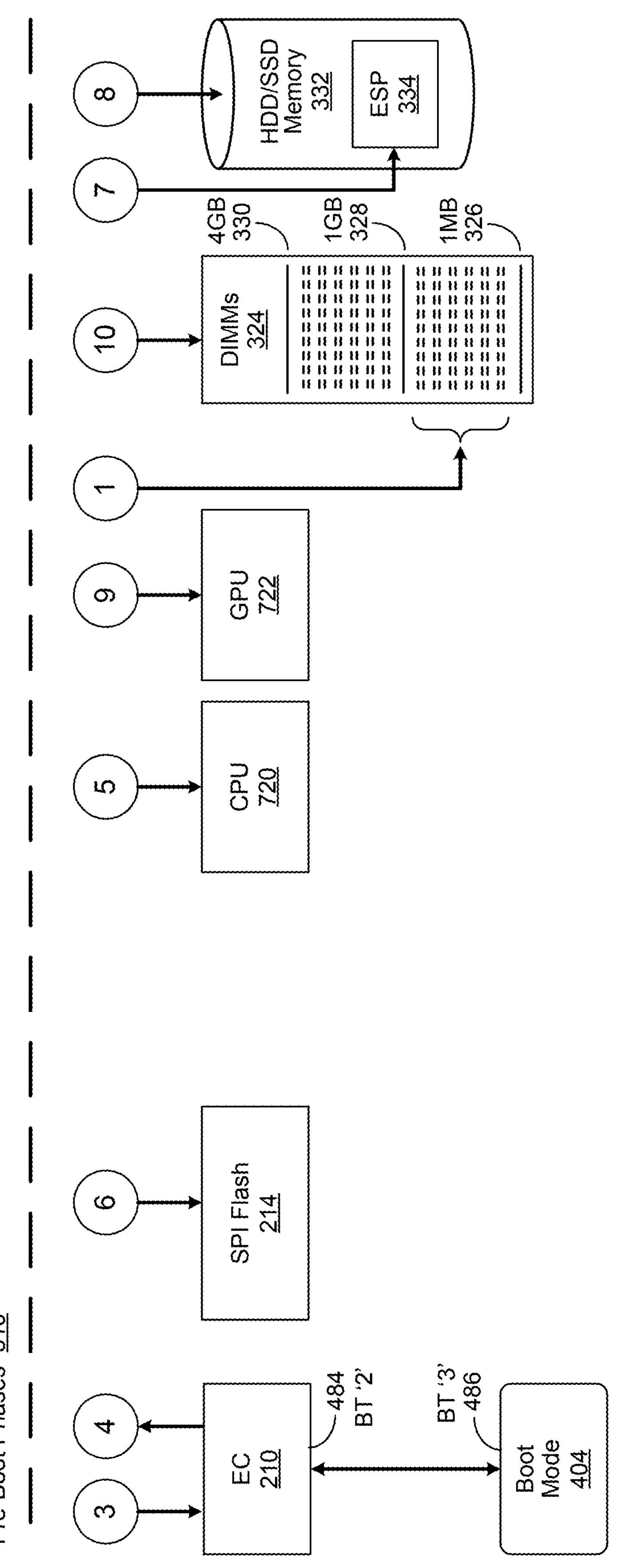

FIG. 6 is a simplified block diagram showing the use of a derived firmware table to perform a derived firmware management operation implemented in accordance with an embodiment of the invention. In various embodiments, one or more derived firmware management operations, described in greater detail herein, may be performed to implement an adaptive tuning protocol for performing an adaptive tuning operation. In certain embodiments, the adaptive tuning operation may be implemented to dynamically detect firmware gaps across heterogeneous vendor hardware exchanges within an information handling system (IHS) when native firmware support is not available for a particular IHS hardware component driver. In various embodiments, the adaptive tuning protocol may be implemented to include an adaptive thermal tuning protocol, an adaptive functional tuning protocol, an adaptive thermal and functional tuning protocol, or a combination thereof, for respectively performing an adaptive thermal tuning operation, an adaptive functional tuning operation and an adaptive thermal and functional tuning operation. In various embodiments, the adaptive thermal tuning operation, the adaptive functional tuning operation, and the adaptive thermal and functional tuning operation, may be respectively implemented to dynamically detects thermal firmware gaps, functional firmware gaps, or thermal firmware gaps and functional firmware gaps, across heterogeneous vendor hardware exchanges within an IHS when native firmware support is not available for a particular IHS hardware component driver.

In certain embodiments, the derived firmware management operation may include generating and using the adaptive tuning protocol. As used herein, an adaptive tuning protocol broadly refers to a standardized set of rules for formatting and processing data used in the performance of a derived firmware operation. In certain embodiments, the adaptive tuning protocol may be used when communicating with an application, any of a plurality of processor components (such as the components described with respect to the multi-processor operating environment shown in FIG. 2), or a combination thereof, regarding information associated with the performance of a derived firmware management operation.

In various embodiments, one or more derived firmware management operations may be performed to generate one or more derived firmware tables, one or more derived firmware table entries, or a combination thereof, to provide derived firmware functionality when native firmware support may be lacking for a particular IHS hardware component. In certain of these embodiments, performance of the one or more derived firmware operations may assist in ensuring compatibility during the exchange, or replacement, of certain IHS hardware components until the next native firmware update for a replacement IHS hardware component is available. Likewise, the provision of such substitute firmware functionality in various embodiments may assist in adaptively optimizing power and thermal mapping for certain IHS hardware components, which in turn may assist in maintaining operational stability of the IHS until an associated native firmware update can be implemented.

Referring now to FIG. 6, an Advanced Configuration and Power Interface (ACPI) table 616 may be implemented in various embodiments during the Operating System (OS)/runtime (RT) 304 phase of an associated information handling system to request and receive certain information stored in a dynamically synchronized power and thermal tuning table 618. In various embodiments, certain information stored in the ACPI table 616 may be retrieved and stored in an object information table 614 during certain pre-boot phases 310. In various embodiments, as described in greater detail herein, the pre-boot phases may include a Pre Extensible Firmware Interface (EFI) Initialization (PEI) 436 phase, a Driver eXecution Environment (DXE) 442 phase, and a System Management Mode (SMM) 612 phase, or a combination thereof.

In various embodiments, one or more derived firmware management operations may be performed to adaptively tune 602 certain power and thermal characteristics of an IHS that has been implemented with one or more exchanged hardware components 508. In certain of these embodiments, the one or more derived firmware management operations may be performed to adaptively adjust one or more firmware settings associated with one or more exchanged hardware components 508, one or more previously-implemented hardware components, or a combination thereof. In various embodiments, the exchanged hard ware components 508 may include one or more Central Processing Units (CPUs) 604, one or more Graphics Processing Units (GPUs) 606, one or more memory units 608, one or more storage units 610, or a combination thereof.

In various embodiments, one or more derived firmware management operations may be performed subsequent to the detection 620 of a particular hardware component of an associated IHS being exchanged or replaced. In various embodiments, certain information associated with characteristics 622 of one or more exchanged hardware components may be used in the performance of one or more derived firmware management operations to generate a derived firmware table 632. In certain of these embodiments, the characteristics 622 of the one or more exchanged hardware components may include operational characteristics of an associated one or more CPUs 624, one or more GPUs 626, one or more memory units 628, one or more storage units 630, or a combination thereof.

In various embodiments, one or more derived firmware management operations may be performed to generate a power and thermal characteristics table 634 from the derived firmware table 632. In various embodiments, one or more derived firmware management operations may be performed to use certain information contained in the power and thermal characteristics table 634 to tune 636 the performance of one or more associated hardware components. In certain of these embodiments, such tuning 636 may involve adjusting certain firmware settings associated with a previously-installed hardware component 640 to generate corresponding derived firmware settings for an exchanged hardware component 650.

FIGS. 7*a* through 7*d* are a simplified block diagram showing the performance of certain derived firmware management operations performed in accordance with an embodiment of the invention to provide interim firmware functionality for an exchanged hardware component. In various embodiments, one or more derived firmware management operations, described in greater detail herein, may be performed to dynamically monitor changes in the hardware component configuration of a particular information handling system (IHS). In certain of these embodiments, one or more derived firmware management operations may likewise be performed in response to such changes, such as adjusting processor, memory, and storage firmware settings at Operating System (OS) runtime 304. In various embodiments, one or more derived firmware management operations may be performed to generate one or more derived firmware tables 632, or one or more entries therein, or a combination thereof, to provide derived firmware functionality on an interim basis for unsupported IHS hardware components. In various embodiments, the provision of such derived firmware functionality may assist in ensuring compatibility during the exchange of one IHS hardware component for another. In various embodiments, the performance of such derived firmware management operations may result in optimizing power and thermal mapping to maintain stability for an IHS that may contain certain hardware components that currently lack native firmware support.

In various embodiments, one or more derived firmware management operations may be performed to ensure processor, memory, and other IHS hardware component firmware settings are adjusted to accommodate the addition of one or more interdependent hardware components that may lack native firmware support. In various embodiments, one or more derived firmware management operations may be performed to generate a derived firmware table 632 for an IHS hardware component that lacks native firmware support. In certain of these embodiments, the previously-described adjustments to the firmware setting of other interdependent IHS hardware components may be taken into account when generating a particular derived firmware table 632, or one or more entries therein, or a combination thereof, such that certain performance metrics of an associated IHS can be maintained.

In various embodiments, one of more derived firmware management operations may be implemented to be performed at OS runtime 304. In certain of these embodiments, the one or more derived firmware management operations may be implemented to adaptively adjust processor, memory, and other IHS hardware component settings to accommodate changes in the hardware component configuration of an associated IHS. In various embodiments, such changes may be stored in one or more derived firmware tables 632, or one or more entries therein, or a combination thereof, to provide interim firmware functionality that has been tuned to the current hardware component configuration of its associated IHS. In certain of these embodiments, the provision of such tuned interim firmware functionality may assist in supporting the anticipated performance of hardware components that may lack native firmware support.

In various embodiments, one or more derived firmware management operations may be performed at OS runtime 304 to determine whether firmware implemented for use by a particular hardware component implemented in an IHS is compatible with its replacement. In certain of these embodiments, one or more derived firmware management operations may be performed to enumerate firmware support for the exchanged hardware component if its currently implemented firmware is determined to be incompatible. In various embodiments, one or more derived firmware management operations may be performed to use such firmware support enumerations to assist in ensuring interim firmware support for the exchanged IHS hardware component until native firmware support can be implemented. In various embodiments, one or more derived firmware management operations may be performed to replace derived firmware support for a particular IHS hardware component with native firmware support once it can be implemented. In certain of these embodiments, the one or more derived firmware management operations may be implemented to use firmware support enumerations to determine which derived firmware element for a particular IHS hardware component may be replaced with native firmware support.

In various embodiments, one or more derived firmware management operations may be performed at OS runtime 304 to learn and evaluate the effect of exchanging, or replacing, one or more hardware components of an IHS. In various embodiments, such knowledge and evaluations may be used in the performance of one or more derived firmware management operations to accordingly update thermal and power efficiency characteristic tables 718 and graphs 500 associated with the exchanged, or replaced, IHS hardware components. In certain of these embodiments, the knowledge and evaluations may likewise be used in the performance of one or more derived firmware management operations to determine the trajectory of such graphs or curves 500 in response to changes in the hardware component configuration of an associated IHS.

In various embodiments, the trajectory of such graphs 500 or curves in response to changes in the hardware component configuration of an associated IHS may be used in the performance of one or more derived firmware management operations to implement a workload-driven evaluation method to assist in optimizing the performance of an associated IHS. Various embodiments of the invention reflect an appreciation that the efficiency of an IHS typically exhibits consistent graph 500 lines and curves after it boots. Various embodiments of the invention likewise reflect an appreciation that whenever one or more hardware components of an IHS are exchanged, or replaced, that such graph 500 lines and curves remain relatively stable to ensure system behavior that is consistent with that which was being exhibited prior to such exchanges, or replacements. For example, an IHS may originally be implemented with a graphics card based upon an Intel® processor, which later may be exchanged, or replaced, with a graphics card based upon an AMD® processor. In this example, the power and thermal compute mapping of the graphics card based upon the AMD® processor should be the same, or substantively similar to, the power and thermal compute mapping of the graphics card based upon the Intel® processor.

Referring now to FIGS. 7*a* through 7*d*, an IHS may be implemented to include an OS runtime phase 304, various pre-boot phases 310, and a platform architecture 302. In various embodiments, as described in greater detail herein, the platform architecture 302 may be implemented to include an embedded controller (EC) 210, Serial Peripheral Interface (SPI) Flash 214 memory, one or more Central Processing Units (CPIUs) 720, one or more Graphics Processing Units (GPUs) 722, or a combination thereof. In various embodiments, the platform architecture 302 may likewise be implemented to include one or more dual in-line memory modules (DIMMs) 324, and certain hard disk drive (HDD) memory, or solid state drive (SSD) memory, or a combination of the two 332.

In various embodiments, the SPI Flash 214 memory may be implemented to receive, store, manage, and provide access to one or more Basic Input/Output System (BIOS) components, described in greater detail herein. In various embodiments, the HDD/SDD memory 332 may be implemented to include an extensible firmware interface (EFI) system partition (ESP) 334, likewise described in greater detail herein. In various embodiments, the OS runtime phase 304 may be implemented to include a user mode 306 and a kernel mode 308. In various embodiments, an Input/Output Control (IOCTL) 402 operation, familiar to those of skill in the art, may be performed to switch between user mode 306 and kernel mode 308.

In various embodiments, a derived firmware management operation may be initiated by the IHS receiving a BIOS.exe 412 file in runtime (RT) step '1' 462. In various embodiments, the BIOS.exe 412 file may be implemented as the combination of a flash memory utility and a payload of firmware components, described in greater detail herein. Then, in RT step '2' 464 the BIOS.exe 412 is executed to decompress 414 its payload, which is then converted in RT step '3' 466 into a payload file system (PFS) 416. Flash memory packets 418 are then extracted from the PFS 416 in RT step '4' 468 and provided to an Advanced Configuration and Power Interface (ACPI) table 616 in RT step '5' 470. In various embodiments, certain information within the ACPI table 616, including certain information contained within the decompressed flash memory packets 418, may be provided to an object information table 614.

In various embodiments, certain information within the ACPI table 616, including certain information contained within the decompressed flash memory packets 418, may likewise be processed in RT step '6' 470 to create a memory payload 422. The resulting memory payload 422 is then loaded into a lower memory region of one or more DIMMs 324, such as between 1 megabyte (MB) 326 and 1 gigabyte (GB) 328. In various embodiments, certain information within the ACPI table 616, including certain information contained within the decompressed flash memory packets

418, may likewise be processed in RT step '7' 474 to dynamically synchronize power and thermal tuning settings 718 for certain hardware components of the IHS, such as its CPU 724, GPU 726, memory 728, storage 730, and so forth. An OS reboot 426 operation is then performed in RT step '8' 476.

Once the OS reboot 426 operation has been performed in RT step '8' 476, power is applied 432 to the IHS in pre-boot time (BT) step '1' 432. An embedded controller (EC) 210 is then invoked in BT step '2' 464 which results in the activation of a boot mode 404 in BT step '3' 486, as described in greater detail herein. One or more security (SEC) 434 phase operations may then be performed in BT step '4' 488, followed by the performance of one or more Pre Extensible Firmware Interface (EFI) Initialization (PEI) 436 phase operations in BT step '5' 490, as likewise described in greater detail herein.

In various embodiments, a firmware management protocol (FMP) may be used in the performance of a Driver eXecution Environment (DXE) 442 phase operation in BT step 6' 492 to perform an SPI write 446 operation to write the coalesced flash memory packets 440 to SPI Flash 214 memory. In various embodiments, an SPI write 446 operation may be performed, as described in greater detail herein, in the Driver eXecution Environment (DXE) 442 phase during BT step 6' 492. In various embodiments, one or more derived firmware management operations may be performed during the DXE 442 phase to initiate a firmware driver update 448.

In various embodiments, one or more derived firmware management operations may be performed to adaptively tune 602 certain power and thermal characteristics of an IHS that has been implemented with one or more exchanged hardware components. In certain of these embodiments, the one or more derived firmware management operations may be performed to adaptively adjust one or more firmware settings associated with one or more exchanged hardware components, one or more previously-implemented hardware components, or a combination thereof. In various embodiments, the exchanged hard ware components may include one or more CPUs 720, one or more GPUs 720, one or more DIMMs 324, one or more storage units 332, or a combination thereof. In certain embodiments, one or more information elements stored in the object information table 614 may be used in the performance of such derived firmware management operations.

In various embodiments, the one or more derived firmware management operations performed to adaptively tune 602 certain power and thermal characteristics of an IHS may include using certain characteristics of one or more exchanged hardware components to generate a derived firmware table 632. Such characteristics may be associated with one or more CPUs 624, one or more GPUs 626, one or more memory units 628, one or more storage units 630, or a combination thereof. In various embodiments, one or more derived firmware management operations may be performed to use certain information stored in the resulting derived firmware table 632 to adaptively tune 602 certain power and thermal characteristics of an IHS that has been implemented with one or more exchanged hardware components. In certain of these embodiments, the one or more derived firmware management operations may be performed to adaptively adjust one or more firmware settings associated with one or more exchanged hardware components, one or more previously-implemented hardware components, or a combination thereof.

In various embodiments, the adaptive adjustment of one or more firmware settings associated with one or more exchanged hardware components, one or more previously-implemented hardware components, or a combination thereof, may result in updating thermal and power efficiency characteristic tables and graphs 500 associated with the exchanged, or replaced, IHS hardware components. In certain of these embodiments, the updating of such thermal and power efficiency characteristic tables and graphs 500 may likewise be used in the performance of one or more derived firmware management operations to determine the trajectory of such graphs or curves 500 in response to changes in the hardware component configuration of an associated IHS. In various embodiments, a boot device selection (BDS) 450 phase operation is then performed in BT step '7' 494 to select a boot device to boot the IHS into an OS runtime 454 state.

Figure 8:
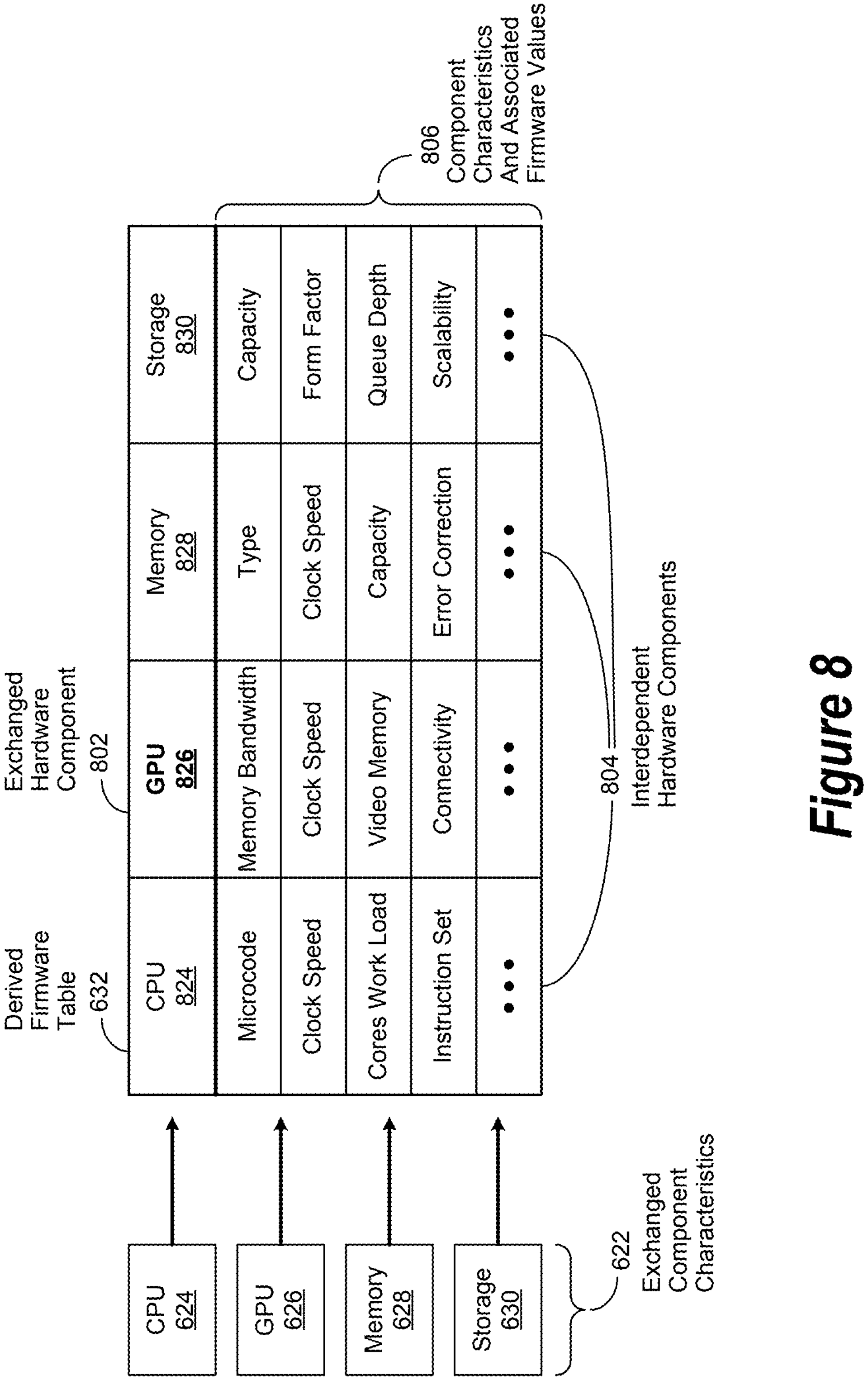
FIG. 8 shows a derived firmware table.

FIG. 8 shows a derived firmware table implemented in accordance with an embodiment of the invention. In various embodiments, one or more derived firmware management operations may be performed, as described in greater detail herein, to process certain information associated with the characteristics 622 of one or more exchanged hardware components to generate derived firmware support, likewise described in greater detail herein, for their operation. Examples of such exchanged hardware components may include one or more Central Processing Units (CPUs) 624, one or more Graphics Processing Units (GPUs) 626, one or more memory units 628, one or more storage units 630, or a combination thereof.

In various embodiments, one or more derived firmware management operations may be performed to store hardware component characteristics information and associated derived firmware values 806 in a derived firmware table 632, as described in greater detail herein. In various embodiments, one or more derived firmware management operations may be performed to generate a separate derived firmware table 632 for each exchanged hardware component. In various embodiments, the hardware component characteristics information and associated derived firmware values 806 stored in a derived firmware table 632 may be respectively associated with a particular exchanged 802 hardware component, one or more interdependent 804 hardware components, or a combination thereof. In various embodiments, the one or more interdependent 804 hardware components may be one or more originally-implemented hardware components, one or more previously-exchanged hardware components, one or more concurrently-exchanged hardware components, or a combination thereof. Those of skill in the art will recognize that many such embodiments are possible. Accordingly, the foregoing is not intended to limit the spirit, scope, or intent of the invention.

As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a firmware management operation, comprising:

providing an information handling system with a distributed unified BIOS;

identifying a processor environment installed on an information handling system from a plurality of processor environments, the processor environment comprising a processor architecture; and, performing a derived firmware management operation, the derived firmware management operation adaptively supporting a hardware component of the information handling system when an exchanged hardware component lacks native firmware support; and wherein the derived firmware management operation interacts with a derived firmware table, the derived firmware table providing substitute firmware functionality when native firmware support is lacking for the hardware component; and, the substitute firmware functionality optimizes at least one of power and thermal mapping of the hardware component.

2. The method of claim 1, wherein:

the derived firmware management operation supports the exchanged hardware component until an associated native firmware update for the exchanged hardware component is implemented within the distributed unified BIOS.

3. The method of claim 1, wherein:

the derived firmware management operation implements an adaptive tuning protocol.

4. The method of claim 3, wherein:

the adaptive tuning protocol includes at least one of an adaptive thermal tuning protocol, a functional tuning protocol and an adaptive thermal and functional tuning protocol.

5. A system comprising:

a processor;

a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for:

providing an information handling system with a distributed BIOS;

identifying a processor environment installed on an information handling system from a plurality of processor environments;

performing a derived firmware management operation, the derived firmware management operation adaptively supporting a hardware component of the information handling system when an exchanged hardware component lacks native firmware support; and wherein the derived firmware management operation interacts with a derived firmware table, the derived firmware table providing substitute firmware functionality when native firmware support is lacking for the hardware component; and, the substitute firmware functionality optimizes at least one of power and thermal mapping of the hardware component.

6. The system of claim 5, wherein:

the derived firmware management operation supports the exchanged hardware component until an associated native firmware update for the exchanged hardware component is implemented within the distributed unified BIOS.

7. The system of claim 5, wherein:

the derived firmware management operation implements an adaptive tuning protocol.

8. The system of claim 7, wherein:

the adaptive tuning protocol includes at least one of an adaptive thermal tuning protocol, a functional tuning protocol and an adaptive thermal and functional tuning protocol.

9. A non-transitory, computer-readable storage medium embodying computer program code, the computer program code comprising computer executable instructions configured for:

providing an information handling system with a distributed unified BIOS;

identifying a processor environment installed on an information handling system from a plurality of processor environments, the processor environment comprising a processor architecture; and, performing a derived firmware management operation, the derived firmware management operation adaptively supporting a hardware component of the information handling system when an exchanged hardware component lacks native firmware support; and wherein the derived firmware management operation interacts with a derived firmware table, the derived firmware table providing substitute firmware functionality when native firmware support is lacking for the hardware component; and, the substitute firmware functionality optimizes at least one of power and thermal mapping of the hardware component.

10. The non-transitory, computer-readable storage medium of claim 9, wherein:

the derived firmware management operation supports the exchanged hardware component until an associated native firmware update for the exchanged hardware component is implemented within the distributed unified BIOS.

11. The non-transitory, computer-readable storage medium of claim 9, wherein:

the derived firmware management operation implements an adaptive tuning protocol.

12. The non-transitory, computer-readable storage medium of claim 11, wherein:

the adaptive tuning protocol includes at least one of an adaptive thermal tuning protocol, a functional tuning protocol and an adaptive thermal and functional tuning protocol.

13. The non-transitory, computer-readable storage medium of claim 9, wherein:

the computer executable instructions are deployable to a client system from a server system at a remote location.

14. The non-transitory, computer-readable storage medium of claim 9, wherein:

the computer executable instructions are provided by a service provider to a user on an on-demand basis.

* * * * *